United States Patent [19]

Kenney-Wallace et al.

[11] Patent Number: 4,658,218

[45] Date of Patent: Apr. 14, 1987

[54] CIRCUIT FOR SYNCHRONIZING A MODE-LOCKED OSCILLATOR-AMPLIFIER DYE LASER WITH A STREAK CAMERA DETECTION SYSTEM

[75] Inventors: Geraldine A. Kenney-Wallace, Toronto, Canada; Edward L. Quitevis, Lubbock, Tex.

[73] Assignee: The United States of America as represented by the Secretary of the Navy, Washington, D.C.

[21] Appl. No.: 679,782

[22] Filed: Dec. 10, 1984

[51] Int. Cl.$^4$ .............................................. G03B 9/70
[52] U.S. Cl. .................................. 330/4.3; 332/7.51; 372/18; 354/129
[58] Field of Search ........................ 372/18; 354/129; 332/7.51; 352/84; 330/4.3

[56] References Cited

U.S. PATENT DOCUMENTS 3,643,568  2/1972  Guillet et al.

OTHER PUBLICATIONS

Quitevis et al., "Synchronization of a . . . Camera System", Rev. Sci. Inst., vol. 55, No. 8, 8/84.
Kalpauzas et al., "Generation and Amplification . . . Media", 1/27/82, pp. 188-198, SPIE, vol. 322.
Shapiro et al., "Streak-Camera . . . Dye Laser", 10/81 pp. 470-472, Optics Letters, vol. 6, #10.
Honda et al., "Measurements of Picosecond . . . Nd:YAG Laser", 1276, IEEE Trans. Inst. Meas., vol. IM-25, #4.
Adams et al., "Synchronized Vetre-Short Pulse . . . Mode-Locked Lasers", 5/26/78, pp. 108-113, Pico. Phenon., HittaHead, USA.

Primary Examiner—Nelson Moskowitz
Attorney, Agent, or Firm—Thomas M. Phillips

[57] ABSTRACT

A synchronization circuit couples a mode-locked oscillator-amplifier laser to a streak camera and Vidicon detection system. A sync signal from a mode-locker driver and a sync signal from a Nd:YAG pump laser act as basic circuit start signals. The circuit, with appropriate electronic timing delays, generates a Q-switch signal to the Nd:YAG laser to control the amplifier pump pulses to overlap with a dye laser pulse as it arrives in each stage of an optical amplifier chain.

1 Claim, 6 Drawing Figures

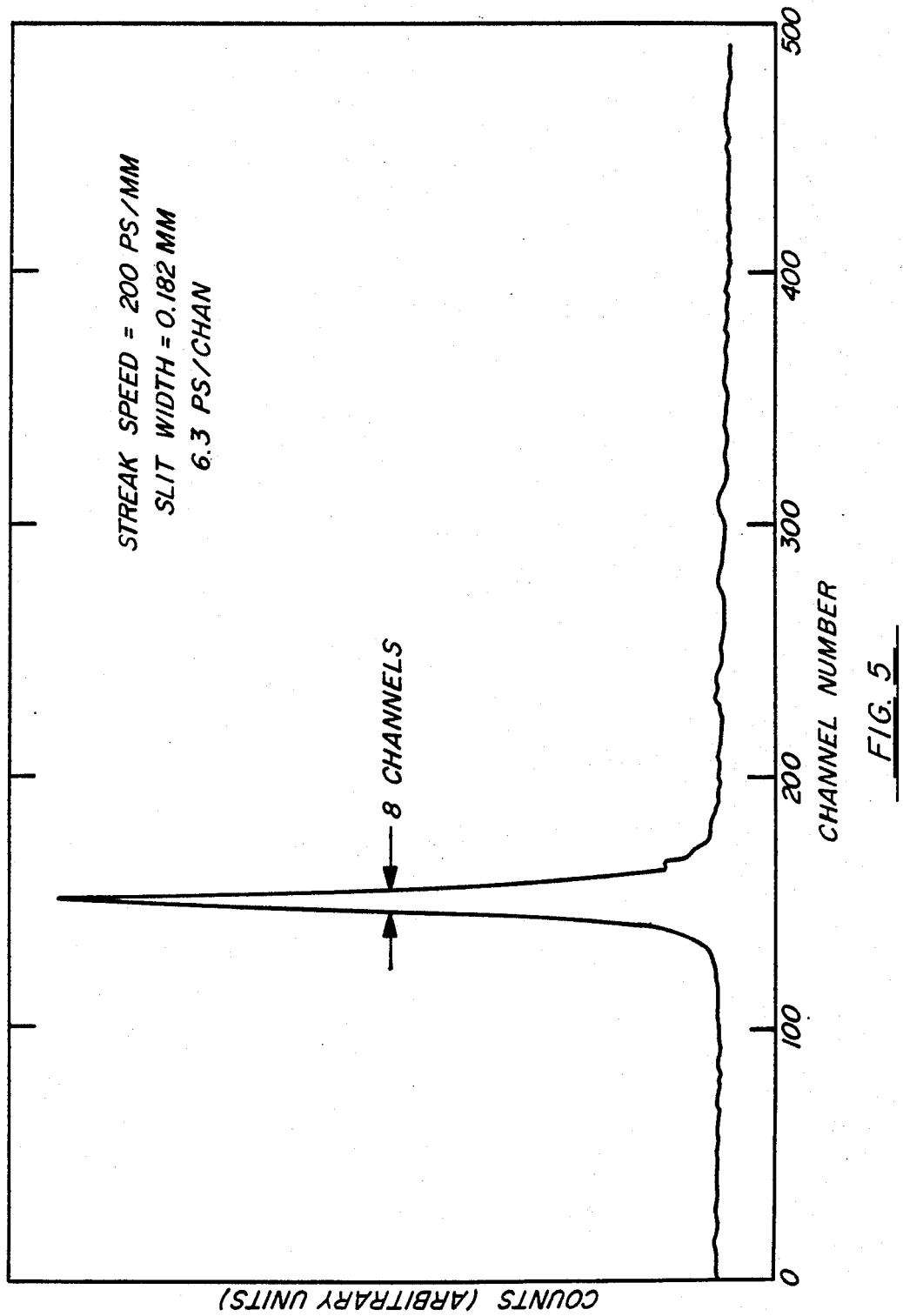

CIRCUIT FOR SYNCHRONIZING A MODE-LOCKED OSCILLATOR-AMPLIFIER DYE LASER WITH A STREAK CAMERA DETECTION SYSTEM

BACKGROUND OF THE INVENTION

1. Field of the Invention

The present invention relates to synchronization of cameras, and more particularly to the synchronization of a mode-locked oscillator-amplifier dye laser with a streak camera detection system.

2. Description of the Prior Art

In recent years picosecond laser systems have been developed which use dye laser amplifiers to increase the energy of continous wave (cw) mode-locked dye lasers from kilowatt to gigawatt peak powers. These laser systems combine the features of the tunability of cw mode-locked dye lasers with the high energies of solid state lasers. The use of an ultrafast streak camera system with such a laser system provides a powerful tool to study time-resolved spectroscopy, in particular luminescent events such as florescence depolarization, semiconductor processes or vibrational relaxation on a picosecond timescale. The operation of this complex system requires the synchronization of the various optical and electronic components in order to both initiate and record the ultrafast event with the optimum spectral and temporal resolution.

SUMMARY OF THE INVENTION

Accordingly, the present invention provides a synchronization circuit which couples a mode-locked oscillator-amplifier laser to a streak camera and Vidicon detection system. Sync signals from a mode-locker driver and from a Nd:YAG pump laser act as basic circuit start signals. The circuit, with appropriate electronic timing delays, generates a Q-switch signal to the Nd:YAG laser to control the amplifier pump pulses to overlap with a dye laser pulse as it arrives in each stage of an optical amplifier chain.

Therefore, it is an object of the present invention to provide a synchronization circuit to coordinate an actively mode-locked oscillator-amplifier dye laser and streak camera system.

Another object of the present invention is to provide a synchronization circuit in which amplification of an optical amplifier chain is independent of time jitter between an injected dye laser pulse and an amplifier pump pulse after a photostationary state is achieved.

Other objects, advantages and novel features will be apparent from the following detailed description when read in conjunction with the appended claims and attached drawing.

BRIEF DESCRIPTION OF THE DRAWING

FIG. 5 is a graph of the sum of streak camera traces of amplified dye laser pulses obtained according to the present invention.

DESCRIPTION OF THE PREFERRED EMBODIMENT

Figure 1:
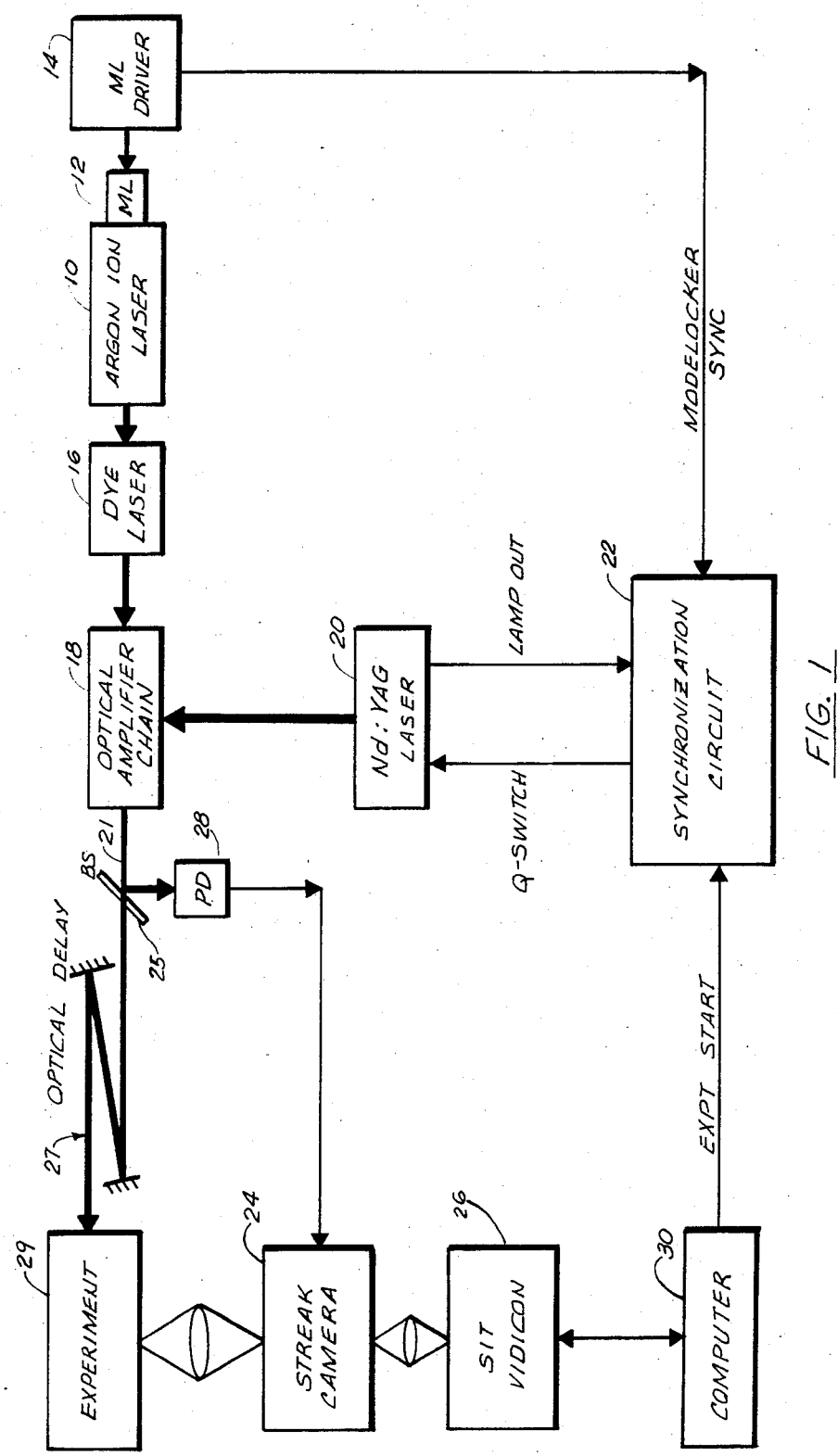
FIG. 1 is a block diagram of an oscillator amplifier laser and streak camera system with a synchronization circuit according to the present invention.

Referring now to FIG. 1 a block diagram of a laser/streak camera system is shown. The laser system has an argon ion laser 10 which is acousto-optically mode locked by a mode-locker 12 which is in turn driven by a mode-lock driver 14. The argon ion laser 10 pumps a $300\mu$ thick jet-stream into a folded cavity dye laser 16. Synchronous mode-locking is obtained by matching the effective cavity lengths of the two lasers 10, 16. The resulting train of mode-locked dye pulses from the dye laser 16, typically of width$\geq$0.8 ps, interpulse separation 12 ns and an average power of 150 mW, is injected into a multi-stage optical amplifier 18. The amplifier chain 18 is pumped by a Nd:YAG laser 20. The Nd:YAG laser delivers typically 120 mJ at 532 nm in 8 ns pulses at 10 pps, a repetition rate selected from maximum flashlamp stability and minimal thermal lensing in the rods.

To achieve efficient amplification the pump pulse from the Nd:YAG laser 20 must be synchronized to overlap with the pulse from the dye laser 16 as it arrives in each amplifier stage of amplifier chain 18. Amplification, or the net gain, depends upon maximizing the inverted population density, which is determined by the rate at which excited dye molecules in the amplifier stages are generated versus the rate at which they are de-excited by amplified spontaneous emission. For an ideal square pump pulse high gain is achieved when the steady-state polulation of excited molecules is limited by amplified spontaneous emission. This photostationary state is established in a short time compared to the nanosecond pump pulse duration. Thus, amplification becomes independent of time jitter between the injected dye pulse and the amplifier pump pulse after this steady state is achieved. The actual pump pulse is not square, and a pronounced mode beating structure exists on such Nd:YAG laser pulses which hides significant amplitude fluctuations on a subnanosecond timescale. If the time jitter, the temporal uncertainty on a pulse-to-pulse basis of the time position of the picosecond dye laser pulse within the nanosecond envelop of the amplifier pump pulse, is so great that the dye laser pulse sometimes arrives before the photostationary state is established, gross amplitude fluctuations in the amplification occur on a pulse-to-pulse basis.

A synchronization circuit 22 provides synchronization with subnanosecond time jitter. The principle sources of jitter between the dye laser 16 and the Nd:YAG laser 20 are (1) steady drift or random jumps in the mode-locking frequency of the argon ion laser 10, (2) electronic jitter in the firing circuits of the Nd:YAG laser, (3) amplitude fluctuations in the output power of the Nd:YAG laser, and (4) jitter in the synchronization circuit 22. An ultrastable oscillator in the mode-locker driver 14 minimizes drifts on the mode-locker frequency, and operating at a single frequency reduces that time jitter. The intrinsic jitter between the Q-SWITCH pulse and the output laser pulse in the Nd:YAG laser 20 varies over 1-2 ns. Using emitter-coupled logic (ECL) integrated circuits minimize the jitter in the synchronization circuit 22.

The oscillator-amplifier laser system is coupled to a streak camera 24 and Vidicon 26 detection system with the synchronization circuit 22. The circuit 22 uses the MODE-LOCKER SYNC signal of the mode-locker driver 14 and the LAMP OUT signal of the Nd:YAG laser 20 as basic start signals. With appropriate electronic timing delays the circuit 22 generates a Q-SWITCH signal input to the Nd:YAG laser 20 to control the amplifier pump pulses.

Figure 2:
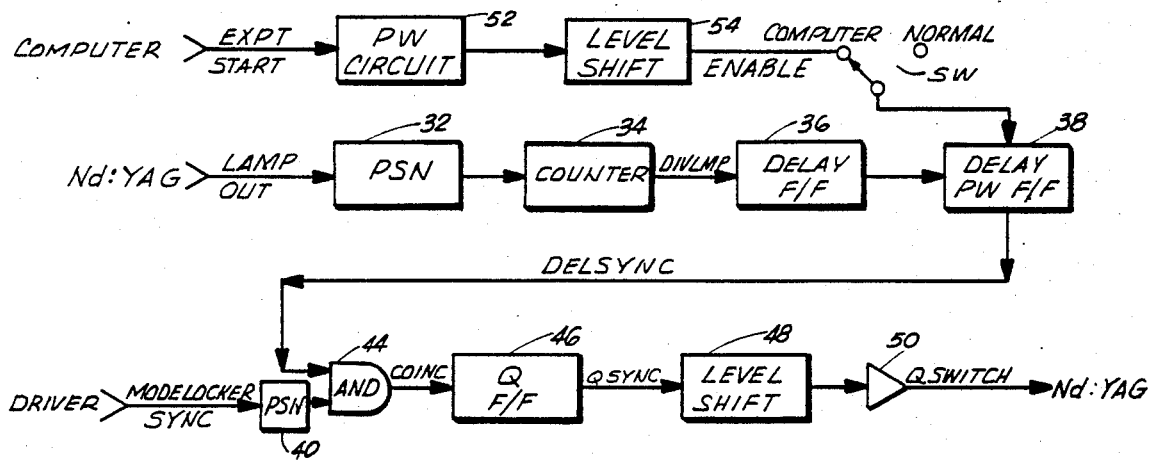
FIG. 2 is a block diagram of the synchronization circuit according to the present invention.
Figure 3:
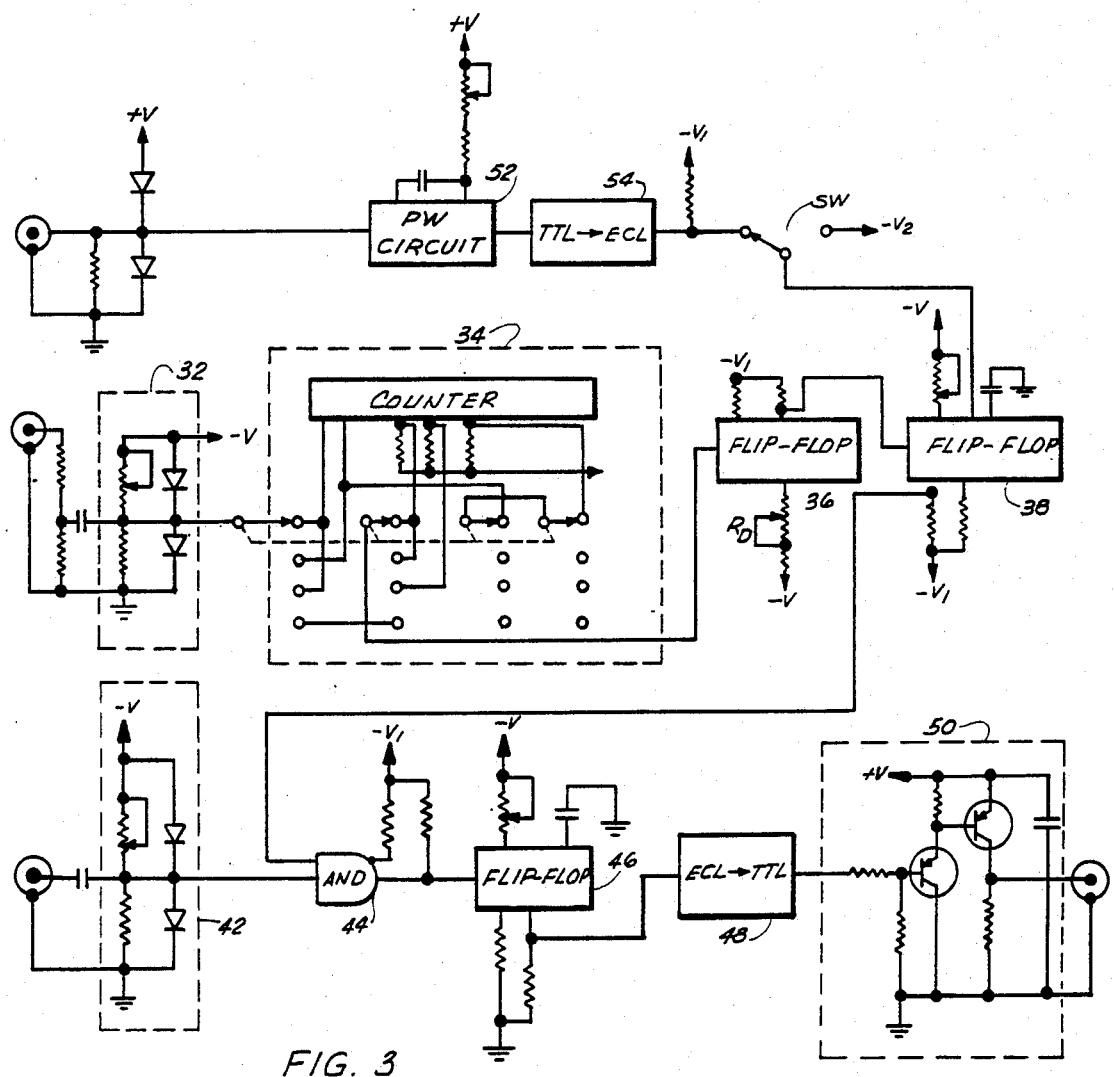
FIG. 3 is a schematic diagram of the synchronization circuit of FIG. 2.
Figure 4A:
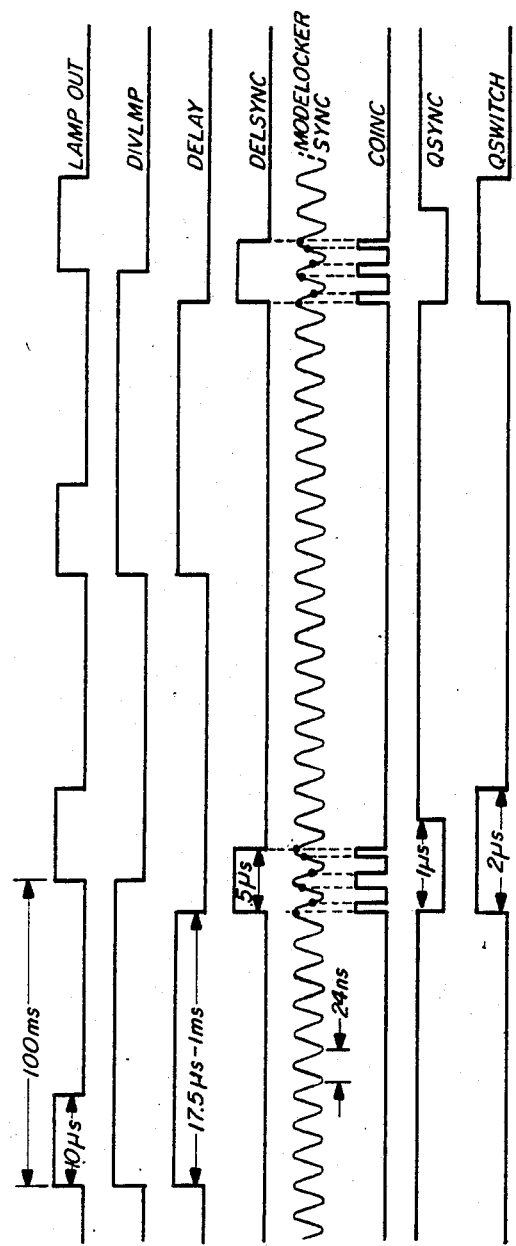
FIG. 4 is a Timing diagram for (a) normal operation and (b) computer controlled operation.
Figure 4B:
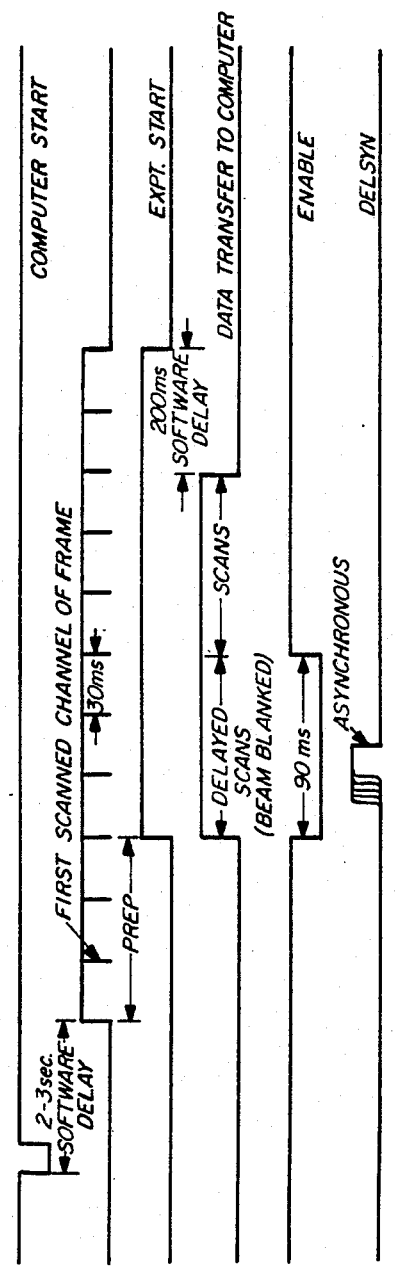

The synchronization circuit 22 shown in FIGS. 2 and 3 makes use of ECL integrated circuits (IC's) which typically have minimum flip-flop toggle speeds of approximately 200 MHz. Subnanosecond precision also can be obtained by driving the flashlamps and the Q-switch of the Nd:YAG laser 20 with a master signal obtained by simply counting down the MODE-LOCKER SYNC signal. FIGS. 4a and 4b identify the different functions from an operational standpoint.

The timing diagram of FIG. 4a illustrates the sequences of signals generated by the circuit 22 in the NORMAL mode. The LAMP OUT signal is capacitively coupled to a pulse shaping network (PSN) which sets the level of this signal to a voltage which is ECL compatible. The LAMP OUT signal at 10 pps may be counted down with a bi-quinary counter 34 to obtain system operation at 1, 2 or 5 pps as well. A DIVLMP signal output from the counter 34 triggers a monostable flip-flop 36 which produces a DELAY signal. The desired overlap of the ND:YAG pump pulse with the dye laser pulse is obtained by varying a resistor $R_d$ to vary the length of the DELAY signal, typically 17.2 $\mu$s to 1 ms. A second monostable flip-flop 38 senses the negative trailing edge of the DELAY signal and provides a narrow pulsewidth DELSYNC signal, typically 0.5 $\mu$s. A second PSN 40 offsets the MODE-LOCKER SYNC sinusoidal reference signal by an amount to make the signal ECL compatible. The MODE-LOCKER SYNC and DELSYNC signals are applied to an AND gate 44 to produce a pulse train waveform COINC. A third monostable flip-flop 46, wired to be non-retriggerable, is fired by the first pulse of COINC. The inverted output of the flip-flop 46 is shifted in level by a level shift circuit 48 and buffered by an amplifier 50 to be compatible with the Q-switch input of the Nd:YAG laser 20. To maintain continuous stable operation the high speed IC's of the circuit 22 are cooled by a chassis-mounted instrument fan.

The output of the dye amplifier 18 is monitored by a photodiode 28, and is peaked by adjusting $R_d$ controlling the length of the DELAY signal. By connecting the output of the synchronization circuit 22 to the input of the Nd:YAG Q-switch driver the jitter between the Nd:YAG pulse and the dye laser pulses is reduced to $\leq 2$ ns.

The streak camera 24 is triggered by a pulse obtained by deflecting a portion of the output of the amplified laser pulse with a beam-splitter 25 into the photodiode 28. To accomodate the inherent electronic delays in the sweep circuitry of the streak camera 24 the remaining laser pulse 21 travels along an optical delay line 27 after the beam-splitter 25 before it reaches the entrance slits of the camera or before initiating some photophysical event in a sample cell 29 positioned directly in front of the slits.

Streaked images of the laser pulse 21 or fluoresence from the sample cell 29 are amplified by an intensifier tube which is part of the streak camera system 24, and then transferred via a lens to the face of a silicon intensified target (SIT) Vidicon detector 26. To operate the detector 26 as a two dimensional array a data processing system 30 is used to both store and normalize data.

For a Princeton Applied Research (PAR) Model 1215 Optical Multichannel Analyzer used as the data processing system 30 to implement the detection sequence, the Analyzer is activated when the optical signal from the phosphor image tube in the camera 24 arrives at the photodiode array of the SIT detector 26. To ensure that the image impressed upon the detector 26 is read correctly illumination must occur just prior to the electron beam starting a frame scan that transfers nonzero data to the Analyzer 30. Thus one or more scans are skipped after each laser pulse and data accumulation starts at the frame scan following these inactive cycles. The scanning electron beam is blanked during these first few inactive frame scans to avoid losing part of the information stored on the target, however, background count is increased. The elements of the microscopic array of photodiodes that comprise the detector 26 target which are light activated act like little charged capacitors. During a blanked cycle these "capacitors" start discharging, thus it is advantageous to have just one inactive cycle. Another capacitive effect is "lags" which occur because the electron beam takes a finite time, dependent upon the incident light intensity, to restore the charge on the target due to an RC time constant. Since the resistance of the silicon target increases as the incident light intensity decreases, the weaker the signal captured the more scans required to read the target. Furthermore, regions in the SIT array that have different incident light intensities will have different lag. These effects become major considerations when the Vidicon detector 26 is used with pulsed light sources.

An EXPT START signal from the processor 30 is used to fire the Nd:YAG laser 20 and inititiate the detection sequence. Referring now to FIG. 4(b) the timing sequence for single shot operation is illustrated. The LAMP OUT signal is maintained at 10 pps. The second flip-flop 38 is inhibited when switch SW is in the COMPUTER position until the EXPT START signal is sent to the synchronization circuit 22 from the data processing system 30. A pulsewidth control circuit 52 and level shift circuit 54 provide an ENABLE pulse from the EXPT START signal that turns on the flip-flop 38, allowing the timing sequence initiated by the DELSYNC signal to proceed. This technique allows the Nd:YAG laser flashlamps to run continuously at the optimum rate.

In the example illustrated there are three preparatory (PREP) frames, three DELAY scans and a track scan time of approximately 30 ms (60 m/channel). For the first three frames the data processing system is inactive, during which time an optical event can be captured by the streak camera 24. The DELSYNC signal is asynchronous with respect to the data processing timing. The EXPT START trigger, coincident with the first DELAYS frame, occurs at a random point between LAMPS OUT pulses. However, setting the ENABLE pulse width by the PW circuit 52 at a sufficient value such as approximately 90 ms assures capture during the DELAYED scans period. After this integration period the electron beam in the SIT detector 26 is turned on, the target is read and data are transferred to the data processor 30. A background shot is taken to compensate for the discharging of the target during the inactive cycles.

FIG. 5 shows the sum of 22 streak camera traces of amplified dye laser pulses 21 obtained with a system and synchronization circuit 22 described herein. The individual streak traces, with intrinsic camera jitter of ~30 ps and trigger jitter due to amplitude fluctuations in the amplified dye pulse, have been shifted to overlap the pulses after raw data are recovered. The recording of these amplified laser pulses 21 simply demonstrate the total oscillator-amplifier dye laser and streak camera system in action.

Thus, the present invention provides a synchronization circuit which provides synchronization between the oscillator-amplifier dye laser and the pump Nd:YAG laser with subnanosecond time jitter, and which electronically synchronizes the streak camera system with the oscillator-amplifier laser system.

What is claimed is:

1. A mode-locked oscillator-amplifier dye laser system synchronized with a streak camera detection system comprising:
    a mode-locked continuous wave laser;
    a dye laser pumped by said mode-locked continuous wave laser;
    an optical amplifier chain to amplify the pulse output of said dye laser;
    a Nd:YAG laser to pump said optical amplifier chain;
    a synchronization circuit which drives said Nd;YAG laser using a lamp out signal from said Nd:YAG laser and a sync signal from a mode-lock driver which drives said mode-locked continuous wave laser such that the pump pulse from said Nd:YAG to said optical amplifier chain overlaps with the pulse output of said dye laser as the pulse output arrives in each stage of said optical amplifier chain;
    a streak camera triggered by a pulse obtained by deflecting a portion of the output of said optical amplifier chain with a beam-splitter to a photodiode;
    a silicon intensified target detector to receive the output of said streak camera;
    an optical delay line after said beam-splitter to compensate for electronic delays in said streak camera;
    a computer to enable said synchronization circuit and said silicon intensified target detector and to receive data from said silicon intensified target detector
    said synchronization circuit comprising:
    means for counting down said lamp out signal from said Nd:YAG laser to produce a divided output signal;
    means for delaying and divided output signal to produce a delay signal;
    means for converting said delay signal into a delayed sync signal;
    means for combining said delayed sync signal with said sync signal from said mode-lock driver to produce a coincidence signal;
    means for forming a Q-switch signal from said coincidence signal to pulse said Nd:YAG laser; and
    means for inhibiting said converting means until a start signal is received from said computer.

* * * * *